United States Patent
Byun et al.

(10) Patent No.: US 8,895,178 B2
(45) Date of Patent: Nov. 25, 2014

(54) BATTERY PACK

(75) Inventors: Jeong-Deok Byun, Yongin-si (KR); Eun-Ok Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 73 days.

(21) Appl. No.: 13/244,011

(22) Filed: Sep. 23, 2011

(65) Prior Publication Data

US 2012/0070702 A1    Mar. 22, 2012

Related U.S. Application Data

(63) Continuation of application No. 12/117,173, filed on May 8, 2008, now Pat. No. 8,053,103.

(51) Int. Cl.
| | |
|---|---|
| H01M 2/02 | (2006.01) |
| H01M 2/04 | (2006.01) |
| H01M 2/10 | (2006.01) |
| H01M 10/48 | (2006.01) |
| H01M 2/34 | (2006.01) |
| H01M 10/34 | (2006.01) |
| H01M 10/30 | (2006.01) |
| H01M 10/052 | (2010.01) |

(52) U.S. Cl.
CPC .......... *H01M 2/0404* (2013.01); *H01M 10/345* (2013.01); *H01M 2/0207* (2013.01); *H01M 10/30* (2013.01); *H01M 2/1061* (2013.01); *H01M 10/486* (2013.01); *H01M 2/34* (2013.01); *H01M 10/052* (2013.01); *Y02E 60/12* (2013.01); *H01M 10/48* (2013.01)
USPC ........... 429/161; 429/158; 429/159; 429/160; 429/163

(58) Field of Classification Search
USPC ............... 429/161, 158, 159, 160, 163
See application file for complete search history.

(56) References Cited

U.S. PATENT DOCUMENTS 6,225,778 B1 *  5/2001  Hayama et al. ............... 320/112
6,524,732 B1    2/2003  Iwaizono et al.
(Continued)

FOREIGN PATENT DOCUMENTS

| EP | 1 416 550 A1 | 5/2004 |
|---|---|---|
| EP | 1 498 964 A1 | 1/2005 |

(Continued)

OTHER PUBLICATIONS

Chinese Office action issued on Sep. 18, 2009 in corresponding Chinese Patent Application No. 200810108613.1, listing of the references in this IDS, 13 pages.

(Continued)

*Primary Examiner* — Jane Rhee
(74) *Attorney, Agent, or Firm* — Christie, Parker & Hale, LLP

(57) ABSTRACT

A battery pack including: a bare cell; a holder disposed at an end of the bare cell, having a connection groove on a side surface thereof; a protection circuit board seated in the holder; and an outer case disposed upon a side of the bare cell, having a connection protrusion mated with the connection groove, to secure the holder. Another battery pack includes: a bare cell including an electrode assembly and an cell case to accommodate the electrode assembly, including an outer casing and a inner casing, the cell case having a connection protrusion disposed at an edge of at least one of the outer and inner casings; a holder disposed at an end of the bare cell, having a connection groove to mate with the connection protrusion and thereby secure the holder; and a protection circuit board seated in the holder.

16 Claims, 11 Drawing Sheets

(56) References Cited

U.S. PATENT DOCUMENTS

| | | | |
|---|---|---|---|
| 7,887,949 B2 | 2/2011 | Yoon | |
| 2004/0251872 A1 | 12/2004 | Wang et al. | |
| 2006/0057458 A1 | 3/2006 | O'Dea et al. | |
| 2006/0176014 A1 | 8/2006 | Moon | |

FOREIGN PATENT DOCUMENTS

| | | |
|---|---|---|
| JP | 2001-196048 | 7/2001 |
| JP | 2002-134080 | 5/2002 |
| JP | 2002-343317 | 11/2002 |
| JP | 2003-17021 | 1/2003 |
| JP | 2003-142043 | 5/2003 |
| JP | 2003-257389 | 9/2003 |
| JP | 2004-022524 | 1/2004 |
| JP | 2004-063383 | 2/2004 |
| JP | 2004-071345 | 3/2004 |
| JP | 2004-214181 | 7/2004 |
| JP | 2005-346964 | 12/2005 |
| JP | 2006-004783 | 1/2006 |
| JP | 2006-004882 | 1/2006 |
| JP | 2006-127846 | 5/2006 |
| JP | 2006-147193 | 6/2006 |
| JP | 2006-164601 | 6/2006 |
| JP | 2006-519461 | 8/2006 |
| JP | 2006-310298 | 11/2006 |
| JP | 2007-157452 | 6/2007 |
| JP | 2008-522361 | 6/2008 |
| KR | 10-2004-0062914 A | 7/2004 |
| KR | 10-2005-0043022 A | 5/2005 |
| KR | 10-2005-0087632 A | 8/2005 |
| KR | 20-0406606 U | 1/2006 |
| KR | 10-2006-0032591 | 4/2006 |
| KR | 10-614278 B1 | 8/2006 |
| KR | 10-2007000-8256 | 1/2007 |
| KR | 10-2007-0022540 | 2/2007 |
| KR | 10-0685115 B1 | 2/2007 |
| KR | 10-835743 | 5/2008 |
| WO | WO 2006/062295 A1 | 6/2006 |

OTHER PUBLICATIONS

European Search Report issued in European Patent Application No. 08156815.6 on Sep. 29, 2008, listing some of the references in this IDS, 6 pages.

Japanese Office action dated Feb. 15, 2011, corresponding to Japanese Patent Application 2007-243854, listing some of the references in this IDS, 2 pages.

Korean Office action dated Apr. 29, 2008 issued to corresponding Patent Application No. 2007-50647, listing some of the cited references listed above, 4 pages.

Korean Notice of Allowability dated Dec. 30, 2008 in corresponding Patent Application No. 2007-50647, listing some of the references listed above, 1 page.

Patent Abstracts of Japan, and English machine translation of Japanese Publication No. 2002-343317, 15 pages.

Patent Abstracts of Japan, and English machine translation of Japanese Publication No. 2004-022524 listed above, 29 pages.

Patent Abstracts of Japan, and English machine translation of Japanese Publication No. 2004-063383 listed above, 16 pages.

English machine translation of Japanese Publication 2007-157452, listed above, (15 pages).

Korean Patent Abstracts, and English machine translation of Korean Patent 10-0685115, listed above, (11 pages).

U.S. Office action dated Oct. 16, 2009, for U.S. Appl. No. 12/117,173, (11 pages).

U.S. Office action dated Apr. 29, 2010, for U.S. Appl. No. 12/117,173, (11 pages).

U.S. Office action dated Aug. 6, 2010, for U.S. Appl. No. 12/117,173, (8 pages).

U.S. Office action dated Jan. 20, 2011, for U.S. Appl. No. 12/117,173, (9 pages).

U.S. Notice of Allowance dated Aug. 2, 2011, for U.S. Appl. No. 12/117,173 (9 pages).

U.S. Office action dated Aug. 24, 2011, for cross reference U.S. Appl. No. 12/247,556, (16 pages).

U.S. Office action dated Feb. 17, 2012, for cross reference U.S. Appl. No. 12/247,556, (14 pages).

\* cited by examiner

BATTERY PACK

CROSS-REFERENCE TO RELATED APPLICATION

This application is a continuation of application Ser. No. 12/117,173 filed May 8, 2008, which claimed the benefit of Korean Patent Application No. 2007-50647, filed May 25, 2007, the disclosure of which is hereby incorporated fully herein by reference.

BACKGROUND OF THE INVENTION

1. Field of the Invention

Aspects of the present invention relate to a battery pack, and more particularly, to a battery pack which can prevent the displacement of a protection circuit board and visual defects, and thus, enhance stability.

2. Description of the Related Art

Secondary batteries are more economical than disposable batteries, because they can be repeatedly charged and discharged. Also, secondary batteries can realize a high capacity in a small volume, and thus, can be widely used in portable electronic/electrical devices, i.e., mobile phones, camcorders, or notebook computers, as a power source.

Such secondary batteries include, for example, nickel-cadmium batteries, nickel-hydride batteries, nickel-zinc batteries, and lithium secondary batteries. Among theses batteries, the lithium secondary batteries are the most widely used, because of their small size, high capacity, high operating voltage, and high energy density per unit weight.

A lithium secondary battery may be classified as can-type or pouch-type, depending on the shape of a casing accommodating an electrode assembly. The electrode assembly includes a positive electrode plate, a negative electrode plate, and a separator. The can-type batteries may be further classified as cylindrical or prismatic.

In the can-type lithium secondary battery, a casing is generally formed of a metal, such as aluminum, and has a cylindrical shape, a prismatic shape, or a pillar shape that has rounded corners. An opening is formed in a top surface of the can, the electrode assembly is inserted into the can through the opening, and then an electrolyte is injected therein. After that, the can is covered with a cap assembly having a size and shape corresponding to the opening formed in the top surface of the can, thereby forming a sealed bare cell.

In the pouch-type lithium secondary battery, an electrode assembly is accommodated in a bottom portion of a pouch-type casing, which has a space for accommodating the electrode assembly. After that, the bottom portion is covered with a top portion of the pouch casing, sealing parts formed at edges of the top and bottom portions of the pouch casing are adhered, thereby forming a sealed bare cell.

The bare cell is electrically connected with a protection circuit board, which includes a protection element to prevent an overcharge, an overdischarge, and/or an overcurrent. In general, the bare cell and the protection circuit board are electrically connected with each other, using a lead terminal, which forms a core pack. A battery pack is completed by packing the core pack in a separate outer case, or filling a gap with a hot-melt resin, and then tubing and labeling the resultant structure, with a thin casing.

In the pouch-type secondary battery, the electrical contact between the bare cell and the protection circuit board is formed, by connecting two electrode tabs projecting from the pouch casing, with corresponding electrical terminals of the protection circuit board. The electrode tab and the protection circuit board have to be precisely combined, to prevent the electrode tabs from being bent and short-circuited, or to be connected with different electrical terminals, through another conductor.

To this end, a holder may be included between the bare cell and the protection circuit board. The holder and the protection circuit board are shaped such that the protection circuit board can be safely placed, and the gap between the bare cell and the protection circuit board can be maintained.

After that, an outer case to protect the surface of the bare cell, which is formed of stainless steel, is disposed at a side surface of the bare cell. The outer case has a resin molding part, which is formed in the gap between the bare cell and the protection circuit board. The resin molding part can be formed from a hot-melt resin that is filled into the gap.

However, when an external pressure is applied toward the gap between the bare cell and the holder, in which the protection circuit board is placed, the protection circuit board may be displaced toward the gap, thereby generating visual defects in the battery pack. Further, the contacts between the electrode tabs and the electrical terminals may be disconnected, due to the displacement of the protection circuit board, and thus, a short circuit may occur.

SUMMARY OF THE INVENTION

Aspects of the present invention provide a case for a battery pack, which can prevent displacement of a protection circuit board.

Aspects of the present invention also provide a battery pack, which can prevent visual defects, and has an enhanced stability.

In one aspect, the invention is directed to a battery pack including: a bare cell; a holder disposed at an end of the bare cell, having a connection groove on a side surface thereof; a protection circuit board seated in the holder; and an outer case combined with a side surface of the bare cell, having a connection protrusion inserted into the connection groove.

In another aspect, the invention is directed to a battery pack including: a bare cell including an electrode assembly, and a cell case to accommodate the electrode assembly, including an outer casing and an inner casing. The cell case includes a connection protrusion extending from an edge thereof; a holder disposed at an end of the bare cell, having a connection groove mate with the connection protrusion; and a protection circuit board seated in the holder.

According to aspects of the intention, the cell case may be a pouch-type case.

According to aspects of the intention, the outer case may be formed of stainless steel or aluminum.

According to aspects of the intention, the connection protrusion may be folded upon itself.

According to aspects of the intention, a plurality of the connection grooves may be formed in the holder, and an equal plurality of the connection protrusions may extend from the outer case or the cell case.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated, from the following description of the exemplary embodiments, taken in conjunction with the accompanying drawings, of which.

DETAILED DESCRIPTION OF THE EMBODIMENTS

Figure 1:
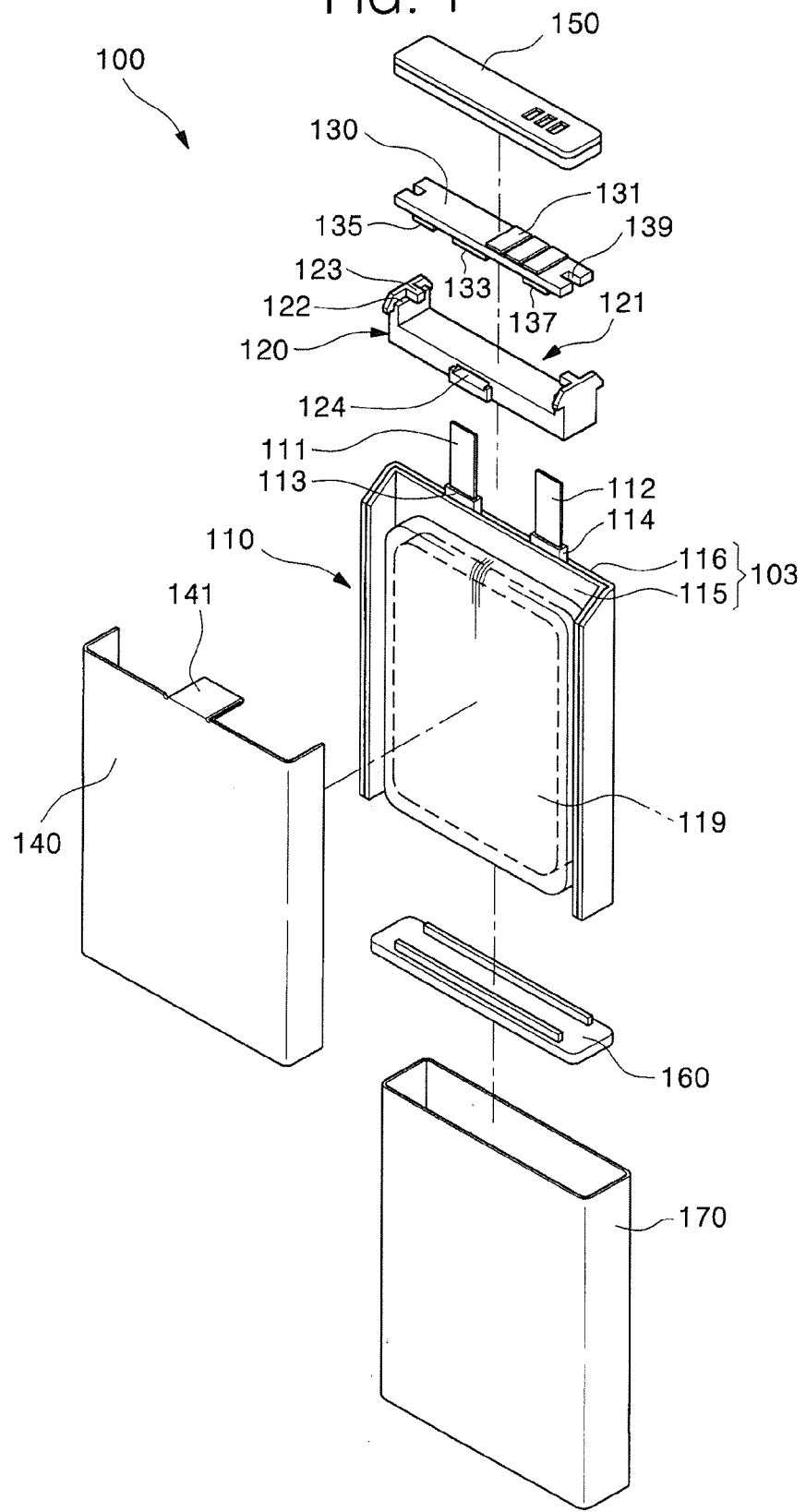
FIG. 1 is an exploded perspective view illustrating a battery pack, according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below in order, to explain the aspects of the present invention, by referring to the figures.

FIG. 1 is an exploded perspective view illustrating a battery pack 100, according to a first exemplary embodiment of the present invention. Referring to FIG. 1, the battery pack 100 includes a bare cell 110 having first and second electrode tabs 111 and 112, which have different polarities, a holder 120 disposed on the bare cell 110, and a protection circuit board 130 seated on the holder 120.

Figure 2A:
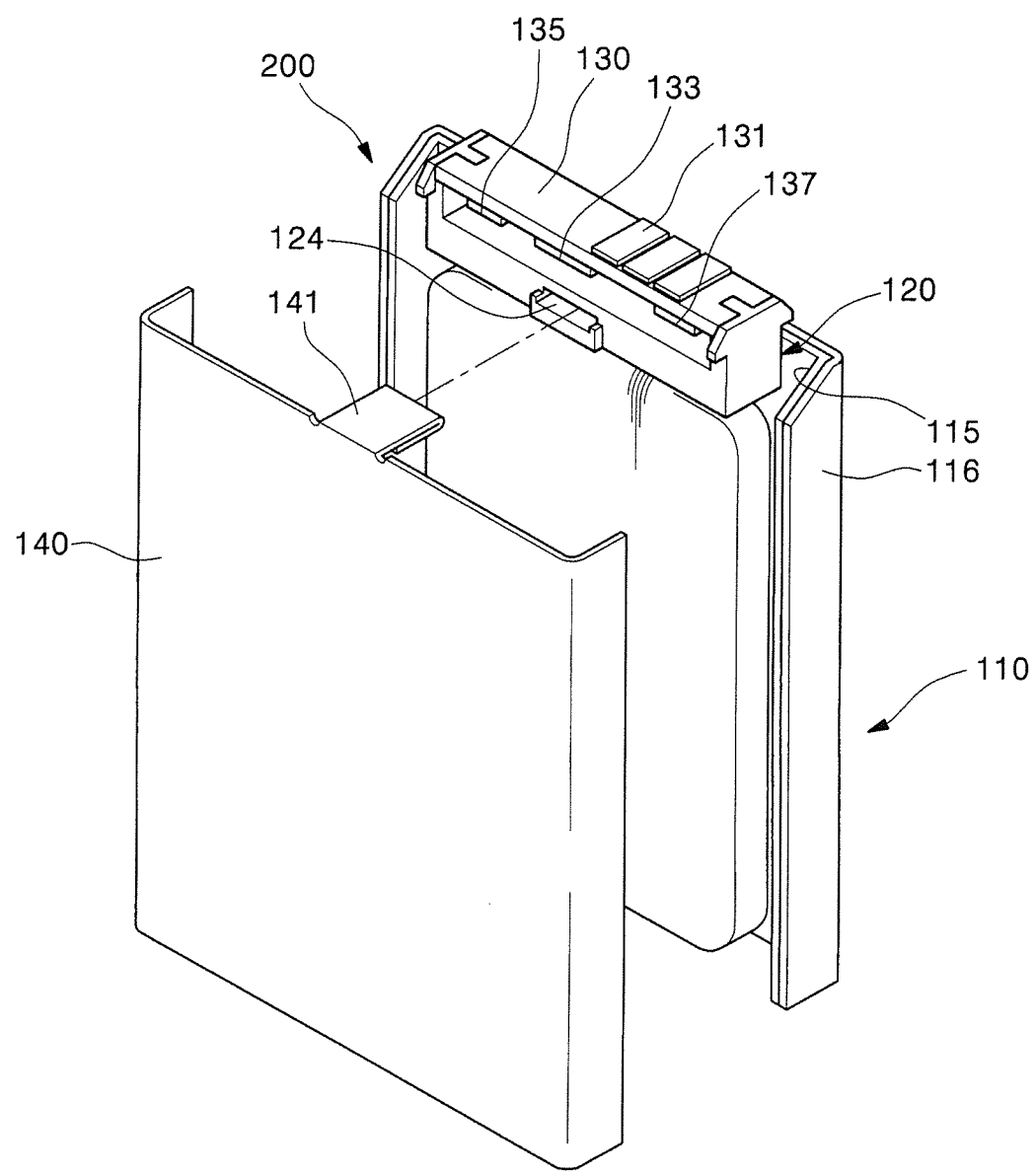
FIG. 2A is an exploded perspective view before an outer case is combined with a core pack, according to the first exemplary embodiment of the present invention.
Figure 2B:
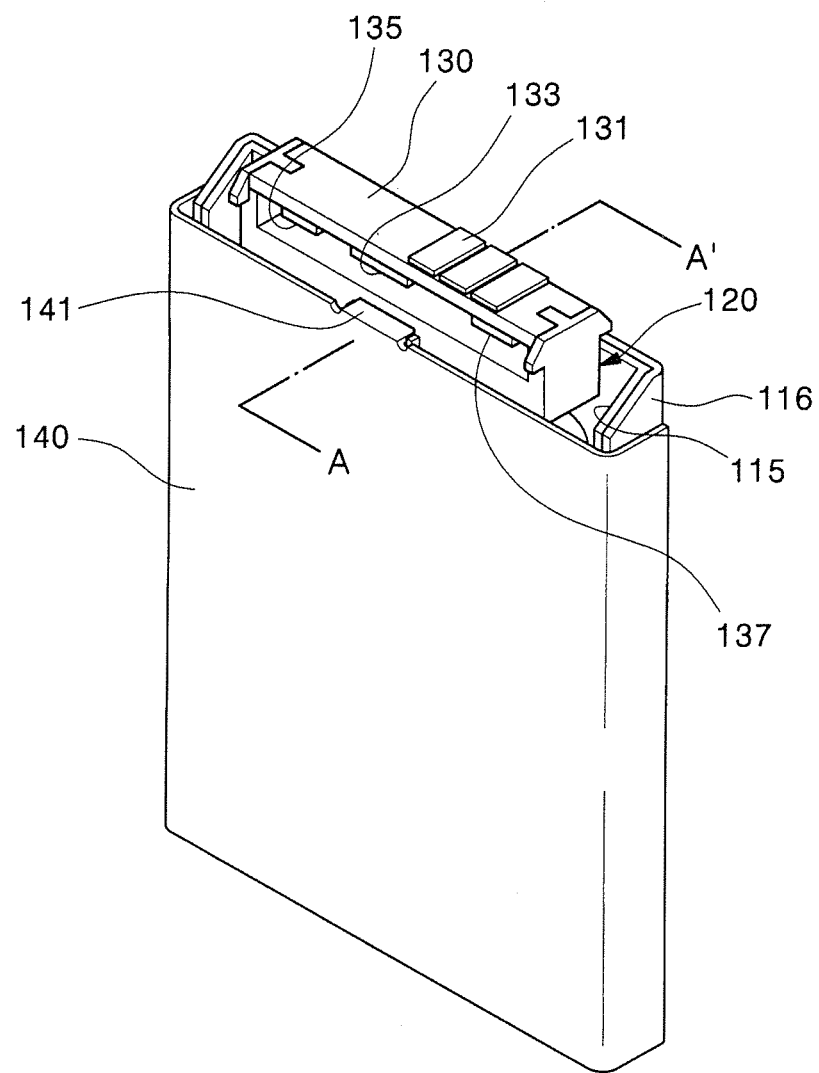
FIG. 2B is an assembled perspective view of the outer case combined with the core pack of FIG. 2A.

Generally, in the secondary battery 100, the bare cell 110 and the protection circuit board 130 are connected with each other, to form a core pack 200 (FIG. 2B). The battery pack 100 includes an outer case 140 disposed at a side of the bare cell 110, to protect the bare cell 110 from external impacts. The first electrode tab 111 can be referred to as a positive electrode tab 111, and the second electrode tab 112 can be referred to as a negative electrode tab 112.

The bare cell 110 includes a cell case 103 to accommodate an electrode assembly 119. The electrode assembly 119 includes a positive electrode plate (not shown), a separator (not shown), and a negative electrode plate (not shown). The positive electrode tab 111 and the negative electrode tab 112 each project from the cell case 103, to electrically connect the electrode assembly 119 to the outside. The positive electrode tab 111 is connected with the positive electrode plate, and the negative electrode tab 112 is connected with the negative electrode plate, by ultrasonic welding, laser welding, etc.

The cell case 103 may be pouch-shaped, and can comprise an inner casing 115, having a space to accommodate the electrode assembly 119, and an outer casing 116 to cover the inner casing 115. Sealing parts are formed at edges of the inner and outer casings 115 and 116, to adhere the inner and outer casings 115 and 116 to one another, and thereby seal the bare cell 110. First and second tab tapes 113 and 114 can be disposed around the positive and negative electrode tabs 111 and 112. The first and second tab tapes 113 and 114 help to seal and insulate the cell case 103. The first tab tape 113 can be referred to as a positive electrode tab tape 113, which is disposed on the positive electrode tab 111, and the second tab tape 114 is referred to as a negative electrode tab tape 113, which is disposed on the negative electrode tab 112.

The holder 120 is disposed between the bare cell 110 and the protection circuit board 130. The holder 120 maintains a gap between the bare cell 110 and the protection circuit board 130. The holder 120 may be formed of plastic. The holder 120 is shaped to seat the protection circuit board 130. To be specific, the holder 120 may include a seat 121, in which the protection circuit board 130 is placed, a seat surface 122, on which edges of the protection circuit board 130 can be placed, and a protrusion 123 to enhance attachment of the holder 120 to the protection circuit board 130.

However, the present invention does not limit the shape of the holder 120, and thus, the shape may be changed and modified in various ways, so long as the protection circuit board 130 can be seated in, and attached to, the holder 120. The holder 120 includes a connection groove 124 defined in a side surface thereof. A connection protrusion 141 extends from an outer case 140 (to be described later) and is mated with the connection groove 124. The side surface of the holder 120 may face the outer case 140, when the outer case 140 is combined with the cell case 103.

When the outer case 140 is combined with the outer casing 116, the connection groove 124 may be formed at a side surface of the holder 120, which faces the outer case 140. When the outer case 140 is combined with the inner and outer casings 115 and 116, the connection groove 124 may be formed at the side surface of the holder 120. The shape of the connection groove 124 corresponds with the shape of the connection protrusion 141.

The protection circuit board 130 includes at least one external connection terminal 131, to electrically connect with an external device, at a top surface thereof. The protection circuit board 130 includes a protection module 133, a positive electrode terminal 135, and a negative electrode terminal 137. The positive electrode terminal 135 and the negative electrode terminal 137 are respectively connected with the positive electrode tab 111 and the negative electrode tab 112, and may be disposed, along with the protection module 133, on a bottom surface of the protection circuit board 130.

When the protection circuit board 130 is combined with the holder 120; the protection module 133, the positive electrode terminal 135, and the negative electrode terminal 137, may be placed on the seat 121 of the holder 120. A groove 139 may be formed at one side of the protection circuit board 130. The groove 139 is mated with the protrusion 123 of the holder 120, to thereby enhance the attachment of the protection circuit board 130 to the holder 120. The protection module 133 may include a PTC element, a temperature sensor, a charge/discharge control circuit, etc., and serves to protect the battery pack from operational errors generated during charging/discharging.

The outer case 140 is combined with a side surface of the bare cell 110, to prevent damage from external impacts, and is formed of stainless steel, aluminum, etc. The outer case 140 may be combined with the bare cell 110, to cover the side surfaces of the cell case 103.

The connection protrusion 141 projects from the outer case 140, and mates with the connection groove 124 of the holder 120. The connection protrusion 141 may extend from the inner casing 115, or the outer casing 116. Sides of the outer case 140, which are combined with the inner and outer casings 115 and 116, may include the connection protrusion 141.

The connection protrusion 141 is shaped to mate with the connection groove 124 formed in the holder 120.

After the outer case 140 is combined with the core pack 200, which includes the bare cell 110, the holder 120, and the protection circuit board 130, upper and lower caps 150 and 160 are attached at top and bottom parts of the battery pack 100, and a label 170 is adhered on the outer case 140, thereby protecting the outer surface of the battery pack 100.

The upper cap 150 may be an integrated, embedded, or cover-type cap. The integrated-type upper cap 150 may be formed by connecting the protection circuit board 130 with the top surface of the bare cell 110, filling the gap between the bare cell and the protection circuit board 130 with nylon-based synthetic resin, and injection-molding the case at a low temperature and pressure. The embedded-type upper cap 150 may be formed by embedding the protection circuit board 130 into a synthetic resin, to form a protection circuit board-embedded upper cap 150, and connecting the upper cap 150 to the top surface of the bare cell 110. The cover-type upper cap 150 may be formed of a synthetic resin, and can be disposed upon the protection circuit board 130, which is disposed at the top surface of the bare cell 110.

The label 170 can be formed of vinyl or a polymer, and serves to protect the outer surface of the battery pack 100. The label 170 forms the external appearance of the battery pack, by recording a necessary product name, and allows the bare cell 100 to be insulated from the outside. The label 170 may include an adhesive layer adhered on an outer surface of the battery back 100, a support layer on which product identification is printed, and a film for protecting the support layer.

Figure 2C:
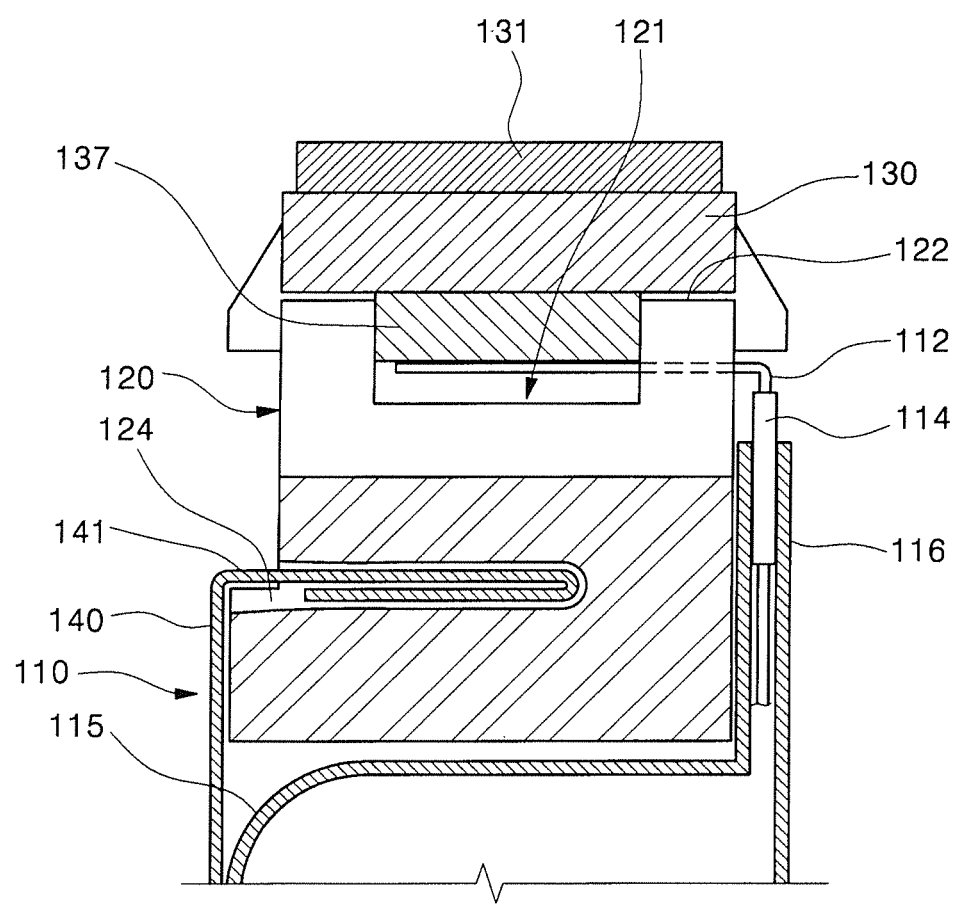
FIG. 2C is a cross-sectional view taken along line A-A' of FIG. 2B.

FIG. 2A is an exploded perspective view of the outer case 140 and the core pack 200, according to the first exemplary embodiment of the present invention. FIG. 2B is a perspective view of the assembled core pack 100 and outer case 140 of FIG. 2A. FIG. 2C is a cross-sectional view taken along line A-A' of FIG. 2B.

Referring to FIGS. 2A to 2C, in the core pack 200, the bare cell 110, and the protection circuit board 130 are connected with each other. The holder 124 is disposed between the bare cell 110 and the protection circuit board 130, to hold the protection circuit board 130, and to maintain a gap between the bare cell 100 and the protection circuit board 130.

Referring to FIG. 2C, the negative electrode terminal 137, of the protection circuit board 130, is connected with the negative electrode tab 112 projecting from the bare cell 110. The positive electrode terminal 135, of the protection circuit board 130, is connected with the positive electrode tab 111 projecting from the bare cell 110. While the positive and negative electrode tabs 111 and 112 are connected with the positive and negative electrode terminals 135 and 137, the protection circuit board 130 is seated on the holder 120.

The protection module 133, the positive electrode terminal 135, and the negative electrode terminal 137, are disposed on the seat 121 of the holder 120. Edges of the protection circuit board 130 are seated on the seat surfaces 122 of the holder 120. The groove 139 of the protection circuit board 130 and the protrusion 123 of the holder 120 are mated, thereby tightly fixing the holder 120 to the protection circuit board 130.

The outer case 140 is disposed on a side surface of the bare cell 110, and the connection protrusion 141 is inserted into the connection groove 124 of the holder 120. The connection protrusion 141 is folded into two layers, and is forced into the connection groove 124. The connection protrusion 141 can thereby be tightly fastened to the connection groove 124.

This exemplary embodiment illustrates one connection protrusion 141 and one connection groove 124, but various numbers of connection protrusions 141 and connection grooves 124 may be formed, according to the size and shape of the outer case 140 and the holder 120. For example, three connection protrusions 141 and three connection grooves 124 may be formed. However, the present invention does not limit the shape of the connection protrusion 141, and thus, the connection protrusion 141 may be changed and modified in various ways, so long as the connection protrusion can securely mate with the groove 124.

When the holder 120 is displaced toward the bare cell 110 by an external pressure, the mating of the connection protrusion 141 and the connection groove 124, serves to fix the holder 120, and thus, may prevent the displacement of the protection circuit board 130 from the holder 120. As a result, a disconnection between the electrode tabs 111 and/or 112 and the electrical terminals 135 and/or 137, may be prevented, and a short-circuit, between the disconnected tabs 111 and/or 112, may also be prevented, thereby improving stability.

Figure 3A:
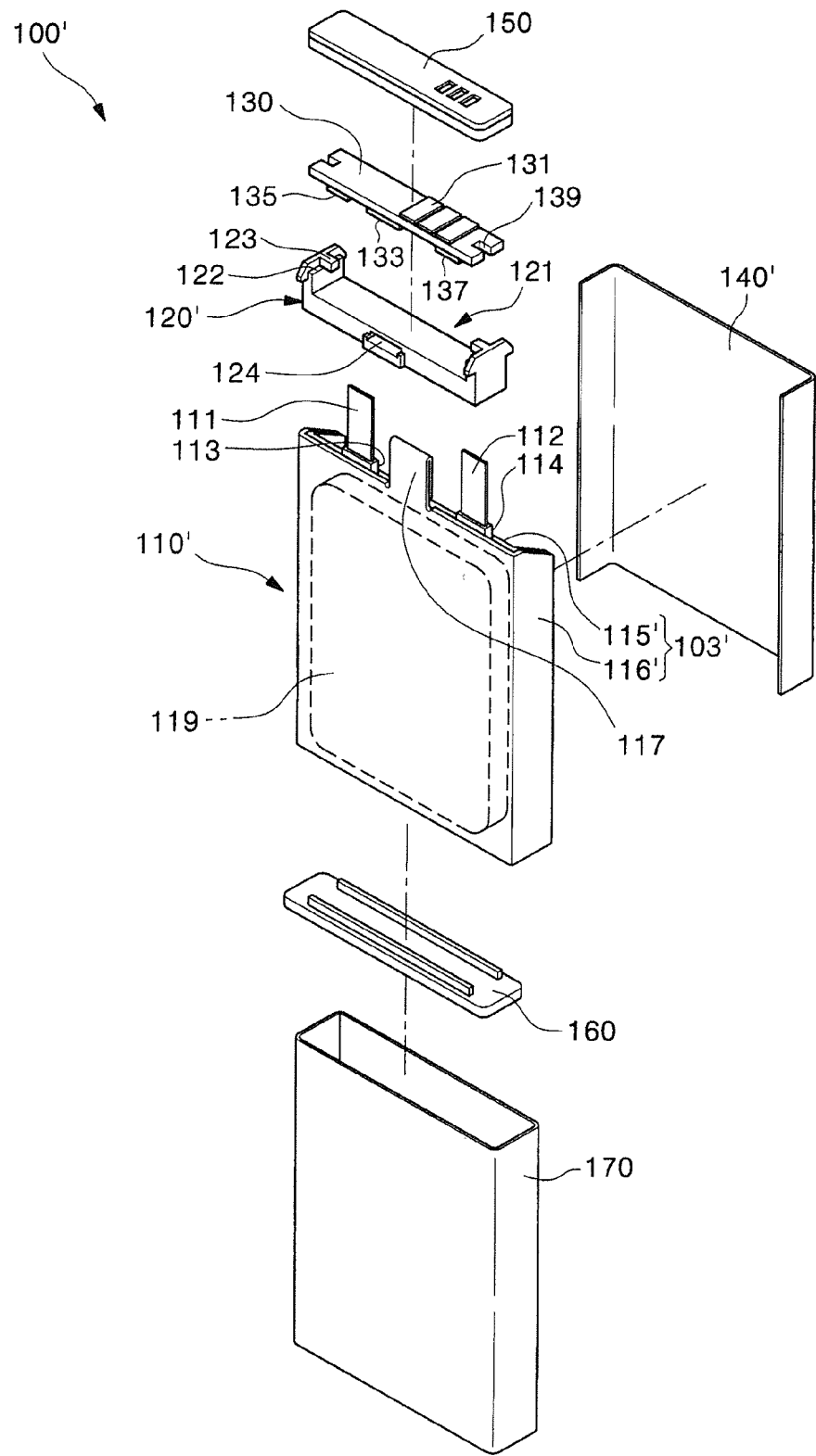
FIG. 3A is an exploded perspective view illustrating a battery pack, according to a second exemplary embodiment of the present invention.
Figure 3B:
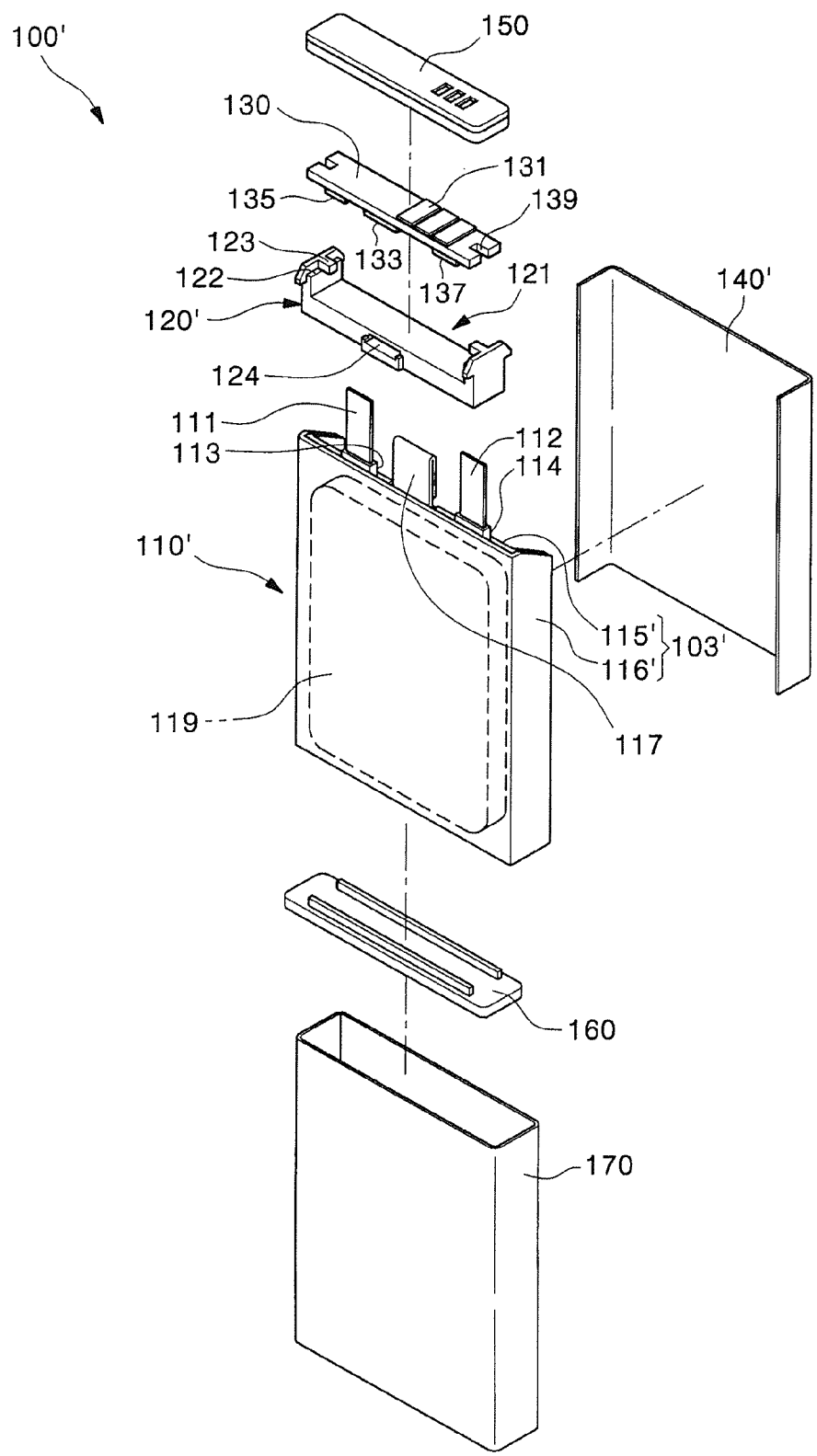
FIGS. 3B to 3D are exploded perspective views of different battery packs according to a second exemplary embodiment of the present invention.
Figure 3C:
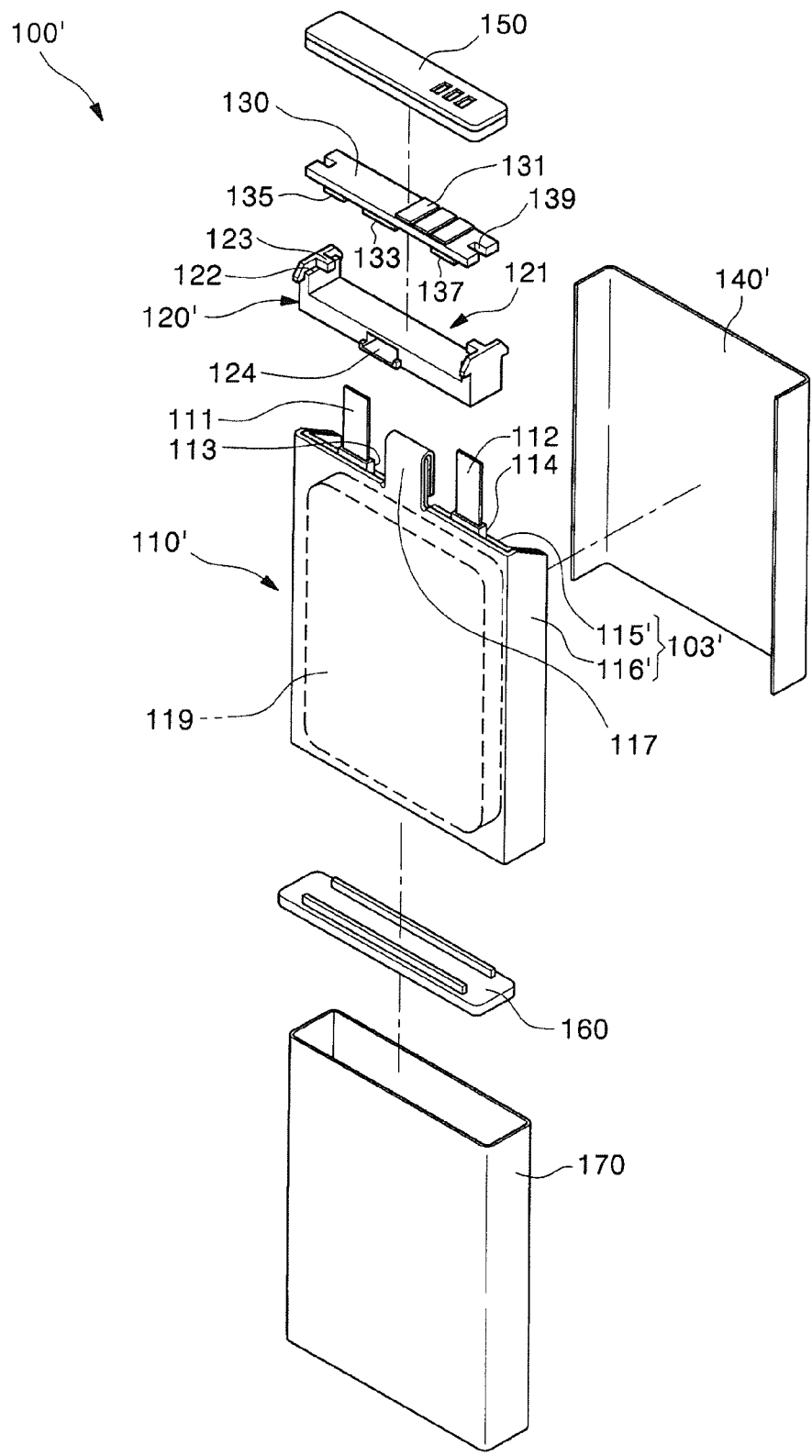
Figure 3D:
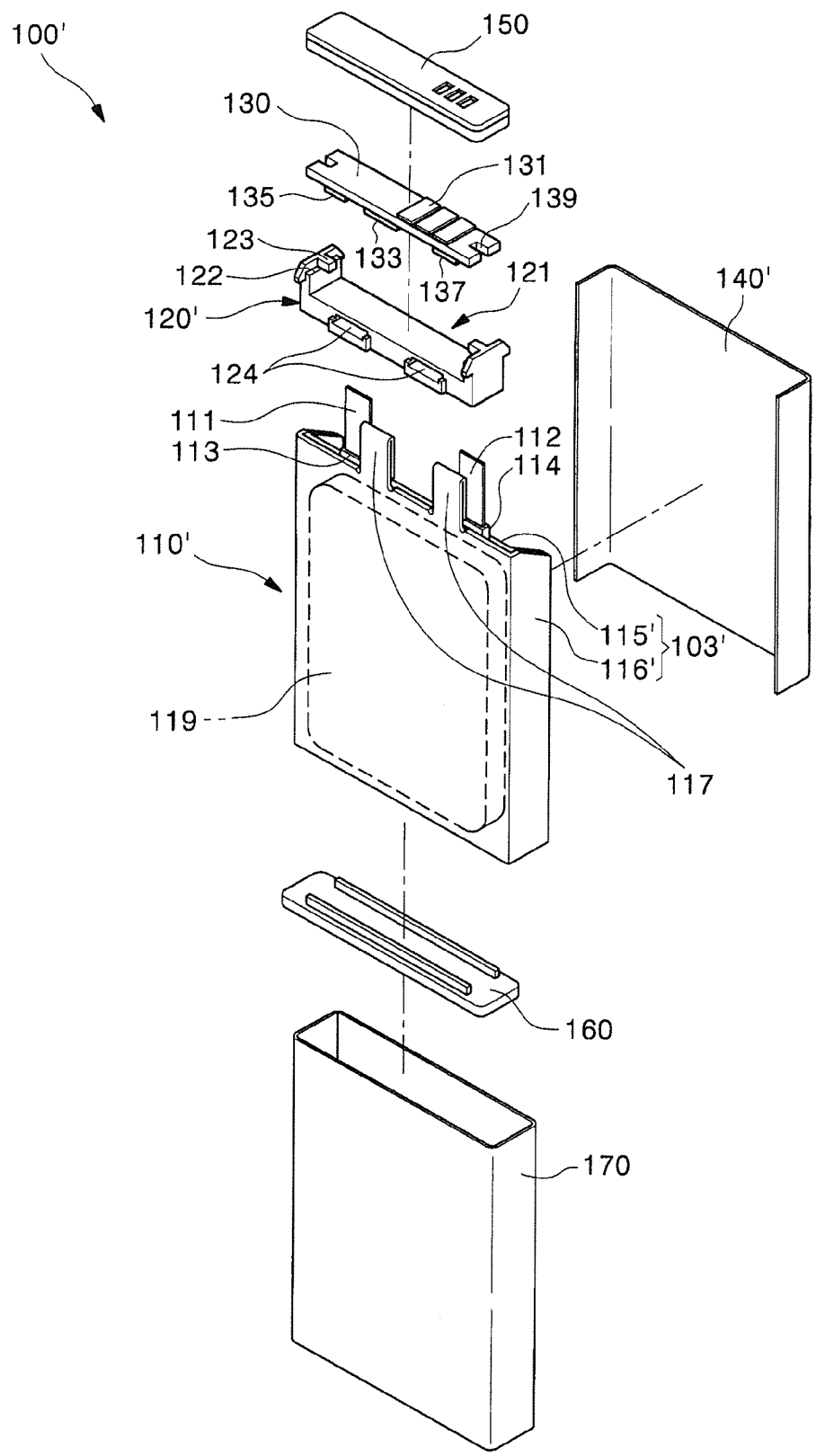

FIG. 3A is an exploded perspective view of a battery pack 100', according to a second exemplary embodiment of the present invention. FIGS. 3B to 3D are exploded perspective views of different battery packs according to a second exemplary embodiment of the present invention. Referring to FIG. 3A, the battery pack 100' includes: a bare cell 110' having a first electrode tab 111 (positive electrode tab) and a second electrode tab 112 (negative electrode tab), which have different polarities; a holder 120' disposed on the bare cell 110'; and a protection circuit board 130 disposed on the holder 120'. In general, in a secondary battery, the bare cell 110', the holder 120', and the protection circuit board 130 are connected with each other, to form a core pack.

The battery pack 100' includes an outer case 140' disposed at a side surface of the bare cell 110', to protect the bare cell 110' from external impacts. The outer case 140' is combined with the core pack. Upper and lower caps 150 and lower cap are disposed on top and bottom ends of the core pack, and a label 170 is adhered on the outer case 140', to protect the outer surface of the battery pack 100'.

The configurations and functions of the elements 111, 112, 113 and 114, of the bare cell 110', are the same as those of the bare cell 110 in FIG. 1, so the detailed description thereof will be omitted. However, as illustrated in FIG. 3A, the battery pack 100' includes a cell case 103'. The cell case 103' includes an outer casing 116' that is disposed on an inner casing 115', which has a space to accommodate an electrode assembly 119. A connection protrusion 117 projects from the outer casing 116', and is to be combined with a connection groove 124 of the holder 120', as will be described later.

The connection protrusion 117 may extend from the inner casing 115' as illustrated in FIG. 3B, or may extend from both the inner and outer casings 115' and 116' as illustrated in FIG. 3C. The connection protrusion 117 may extend from a sealing part of the outer or inner casings 116' or 115', parallel to a direction in which the positive electrode tab 111 and the negative electrode tab 112 project. The connection protrusion 117 may correspond with the connection groove 124 formed in the holder 120', and can be mated therewith.

The holder 120' is disposed between the bare cell 110' and the protection circuit board 130, to maintain a gap between the bare cell 110' and the protection circuit board 130. The protection circuit board 130 is seated on holder 120', which may be formed of plastic. The configurations and functions of the elements 121, 122, 123 and 124, of the holder 120', are the same as those of the holder 120 in FIG. 1, so the detailed description thereof will be omitted.

The connection groove 124 is formed to correspond with the connection protrusion 117. The connection groove 124 is formed on a side surface of the holder 120', which faces the connection protrusion 117.

The protection circuit board 130 includes at least one external connection terminal 131 on a top surface thereof, to electrically connect with an external device. The protection circuit board 130 includes a protection module 133, a positive electrode terminal 135, and a negative electrode terminal 137. The positive electrode terminal 135 and the negative electrode terminal 137 are respectively connected with the positive electrode tab 111 and the negative electrode tab 112, and may be disposed, along with the protection module 133, on a bottom surface of the protection circuit board 130.

When the protection circuit board 130 and the holder 120' are connected with each other; the protection module 133, and the positive and negative electrode terminals 135 and 137, may be disposed on the seat 121 of the holder 120'. A groove 139 may be formed in one side of the protection circuit board 130. The groove 139 is combined with a protrusion 123 of the holder 120', to thereby enhance binding. The groove 139 can be formed on both sides of the protection circuit board 130, to mate with protrusions 123 formed on corresponding sides of the holder 120'.

The protection module 133 may include a PTC element, a temperature sensor, a charge/discharge control circuit, etc. The protection module 133 serves to protect the battery pack 100' from operational errors generated during charging/discharging.

The outer case 140' is combined with a side of the bare cell 110', to prevent damage from external impacts. The outer case 140' is formed of stainless steel, aluminum, etc. The outer case 140' may be combined with the bare cell 110', so as to cover side surfaces of the inner and outer casings 115' and 116', or to cover only the side surfaces of either the inner casing 115', or the outer casing 116' of the bare cell 110'. In this exemplary embodiment, the outer case 140' does not have a protrusion, unlike the embodiment of FIG. 1.

Figure 4A:
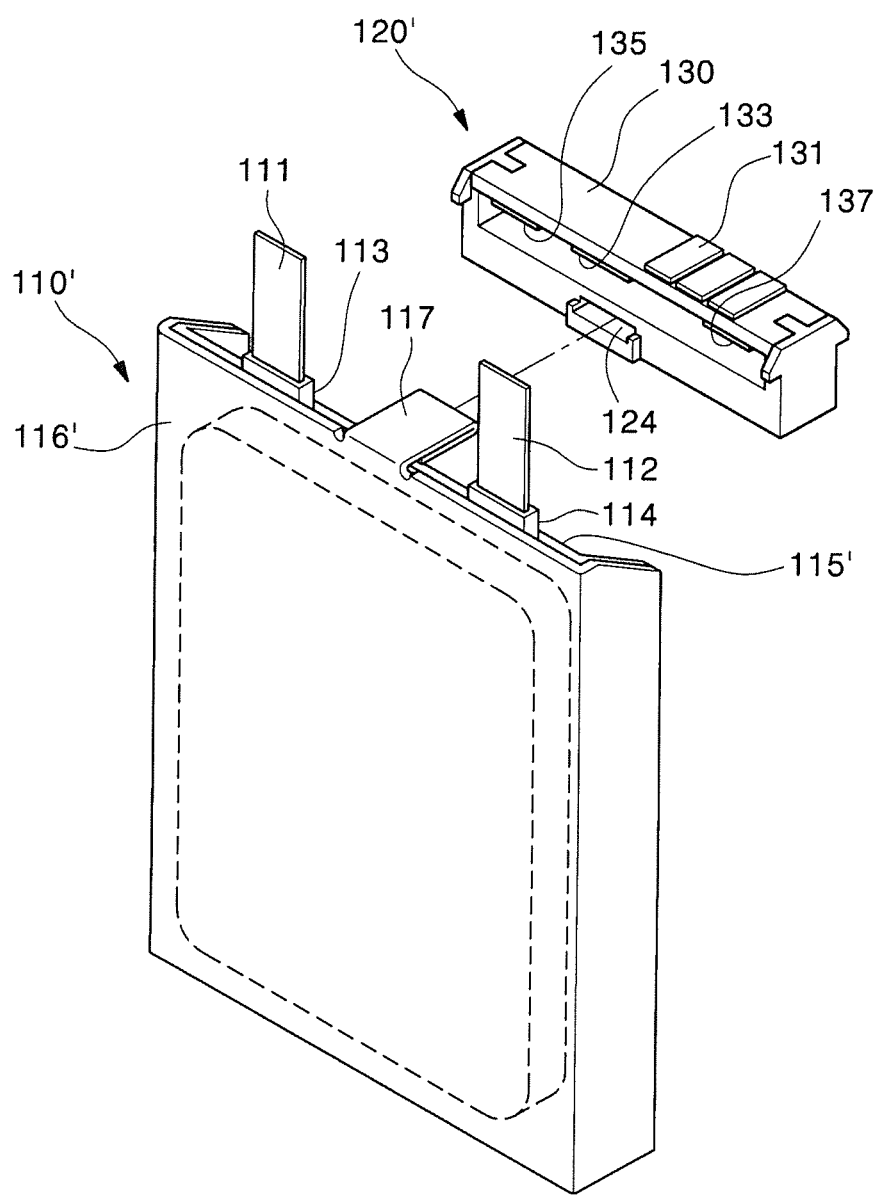
FIG. 4A is an exploded perspective view of a bare cell and a holder, according to the second exemplary embodiment of the present invention.
Figure 4B:
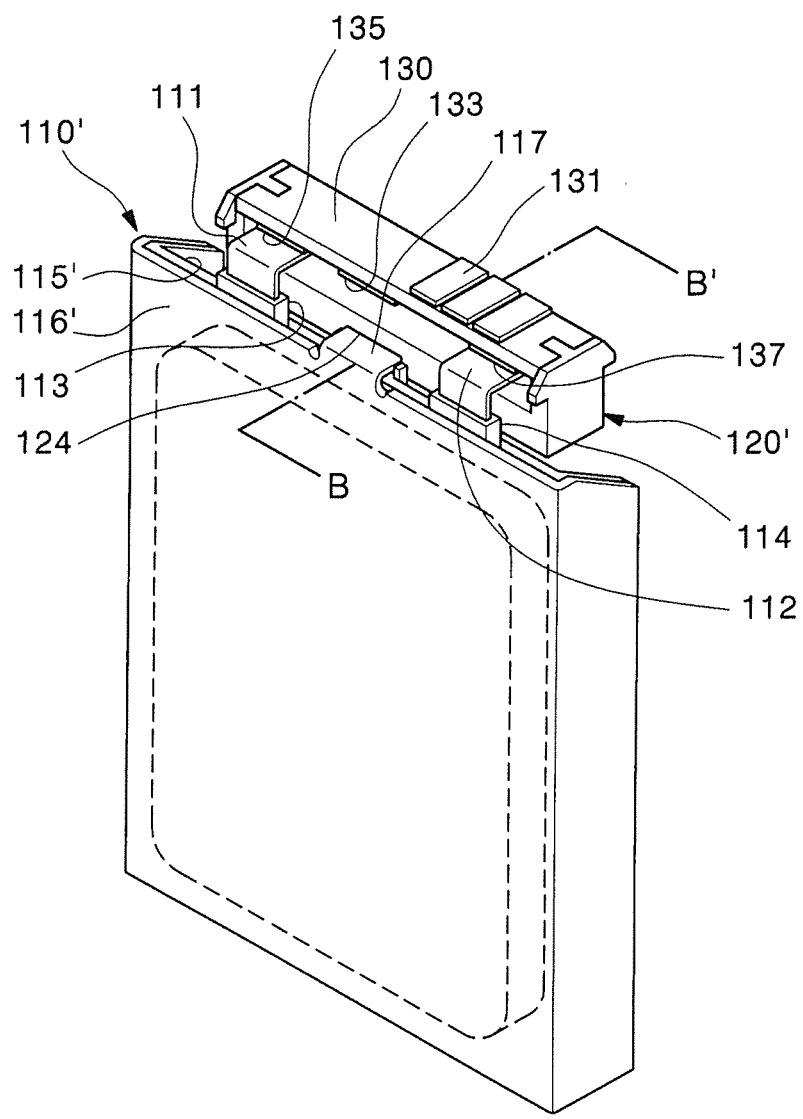
FIG. 4B is a perspective view of the bare cell combined with the holder of FIG. 4A.
Figure 4C:
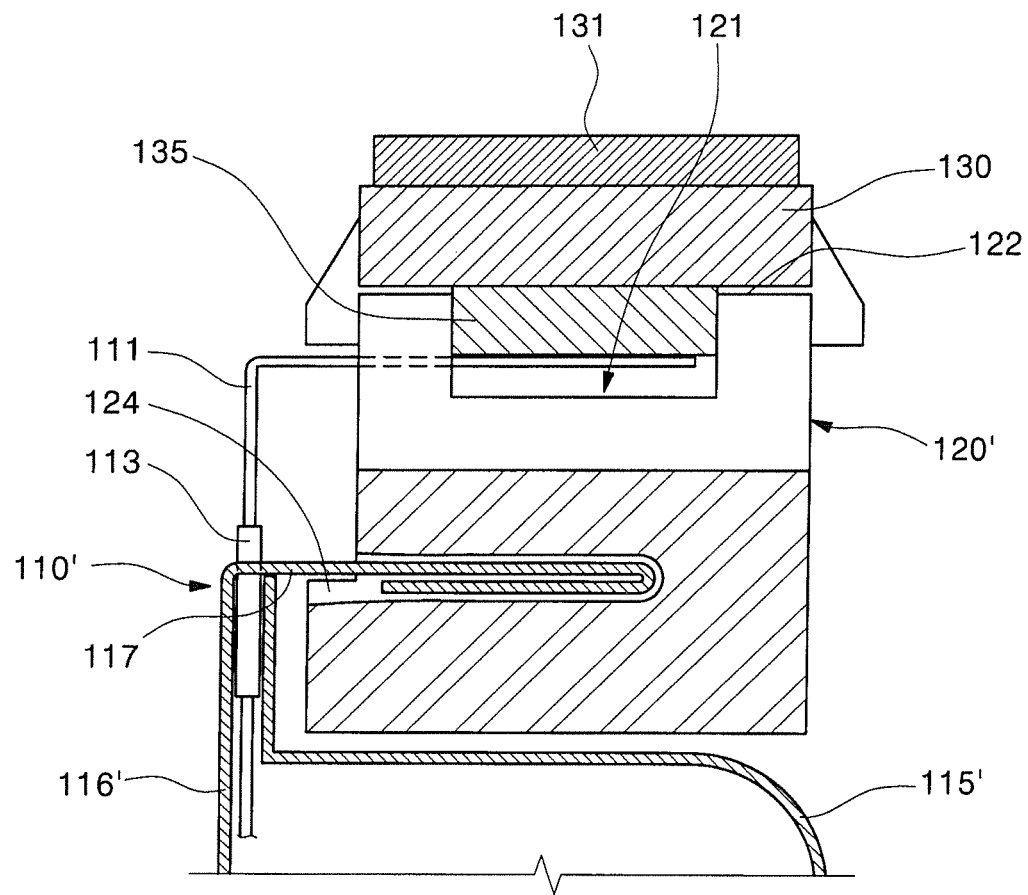
FIG. 4C is a cross-sectional view taken along line B-B' of FIG. 4B.

FIG. 4A is an exploded perspective view of the bare cell 110' and the holder 120', according to a second exemplary embodiment of the present invention. FIG. 4B is an assembled perspective view, of the bare cell 110' and the holder 120', and FIG. 4C is a cross-sectional view taken along line B-B' of FIG. 4B. Referring to FIGS. 4A to 4C, the positive and negative electrode tabs 111 and 112 are respectively connected with the positive electrode terminal 135 and the negative electrode terminal 137, of the protection circuit board 130, which is seated in the holder 120'.

A connection protrusion 117 extends from the outer casing 116' of the bare cell 110', is mated with a connection groove 124 formed on the holder 120', thereby combining the holder 120' with a side of the bare cell 100'. The protection module 133, the positive electrode terminal 135, which is connected with the positive electrode tab 111, and the negative electrode terminal 137, which is connected with the negative electrode tab 112, are placed on the seat 121 of the holder 120'.

Further, both edges of the protection circuit board 130 are placed on a seat surface 122, of the holder 120'. The groove 139 of the protection circuit board 130, and a protrusion 123 of the holder 120', are combined with each other, thereby tightly fixing the holder 120' to the protection circuit board 130.

The connection protrusion 117 is folded upon itself, and is forced into the connection groove 124, to fasten the connection protrusion 117 in the connection groove 124. As illustrated in FIGS. 3A to 3C, one connection protrusion 117 and one connection groove 124 may be formed, and as illustrated in FIG. 3D, two connection protrusions 117 and two connection grooves 124 may be formed. But, various numbers of connection protrusions 117 and connection grooves 124 may be formed, according to the size and shape of the bare cell 110' and the holder 120'. However, the present invention does not limit the size, number, and/or shape of the connection protrusion 117 and the connection groove 124. Thus the size, number, and/or shape may be changed and modified in various ways, so long as the connection protrusion 117 is fastened to the groove 124.

When the holder 120', in which the protection circuit board 130 is seated, is displaced toward the bare cell 110' by an external force, the connection protrusion 117 and the connection groove 124, serve to fix the holder 120', and thus, may prevent the displacement of the protection circuit board 130. Thus, a disconnection of the electrode tabs and/or the electrical terminals, due to displacement, may be prevented, and a short-circuit may also be prevented, thereby improving stability.

As described above, the first exemplary embodiment discloses that the connection protrusion 141 extends from the outer case 140, and is fastened to the connection groove 124 of the holder 120. The second exemplary embodiment discloses that the connection protrusion 141' extends from the outer casing 116', and is fastened to the connection groove 124 of the holder 120'. However, in the second exemplary embodiment, the connection protrusion 141' may be formed on the inner casing 115', or at both the outer and inner casings 116' and 115', and fastened to the connection groove 124 of the holder 120'.

Aspects of the present invention can be implemented by individually applying the first and second exemplary embodiments, or may be implemented by applying both the first and second exemplary embodiments. A connection groove is formed in a holder, a structure inserted into the connection groove, is formed in an outer case, which is disposed at the outer surface of a bare cell, a casing of the bare cell, or casings of the outer case and the bare cell, thereby preventing displacement of a protection circuit board and visual defects, and improving stability.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A pouch type battery pack comprising:
   a pouch including a first casing and a second casing covering the first casing;
   an electrode assembly accommodated in and adjacent to the pouch, the electrode assembly having an electrode tab attached thereto, the electrode tab extending outside the pouch;
   a protection circuit board electrically connected to the electrode tab;
   a holder on the first casing for accommodating the protection circuit board, wherein a portion of at least one of the first casing and the second casing is accommodated in the holder, and
   an upper cap on the protection circuit board;
   wherein the second casing comprises a connection protrusion, and wherein the holder comprises a connection groove mated with the connection protrusion.

2. The pouch type battery pack of claim 1, wherein the holder comprises a seat for accommodating the protection circuit board.

3. The pouch type battery pack of claim 2, wherein the protection circuit board includes a protection module and an electrode terminal on a surface thereof, which faces the holder.

4. The pouch type battery pack of claim 3, wherein the electrode terminal of the protection circuit board contacts the electrode tab in the seat of the holder.

5. The pouch type battery pack of claim 2, wherein the holder further comprises a seat surface projecting from edges of the seat, the seat surface contacting the protection circuit board.

6. The pouch type battery pack of claim 5, wherein the seat surface contacts a short side of the protection circuit board.

7. The pouch type battery pack of claim 5, wherein the holder further comprises a protrusion projecting from the seat surface, and wherein the protection circuit board includes a groove mated with the protrusion of the holder.

8. The pouch type battery pack of claim 7, wherein the protrusion is projected to an inside direction of the holder.

9. The pouch type battery pack of claim 1, wherein the holder comprises plastic.

10. The pouch type battery pack of claim 1, wherein the holder is combined with the pouch.

11. The pouch type battery pack of claim 10, wherein the second casing is combined with the holder.

12. The pouch type battery pack of claim 1, further comprising an outer case to cover the first casing.

13. The pouch type battery pack of claim 1, wherein the connection groove penetrates the holder.

14. A pouch type battery pack comprising:
a holder comprising a first surface, a second surface opposite to the first surface, and a plurality of lateral surfaces between the first surface and the second surface, wherein the holder comprises a connection groove at a side surface thereof;
a pouch type bare cell on the first surface of the holder, the pouch type bare cell including an electrode assembly connected to the protection circuit board, and a cell case accommodating and being adjacent to the electrode assembly and having a sealing part located on the outside of the space; and
a protection circuit board on the second surface of the holder and electrically connected to the bare cell, wherein a portion of the cell case is accommodated in the holder between the electrode assembly and the protection circuit board; and
an outer case facing the space of the cell case, the outer case combined with the cell case;
wherein the outer case comprises a connection protrusion in the connection groove of the holder.

15. The pouch type battery pack of claim 14, wherein a surface of the sealing part is perpendicular to the first surface of the holder.

16. The pouch type battery pack of claim 14, wherein the bare cell further comprises an electrode tab penetrating the sealing part and connected to the electrode assembly, the electrode tab being connected to the protection circuit board via a space in the holder.

* * * * *